US012211142B2

(12) United States Patent
Fu et al.

(10) Patent No.: US 12,211,142 B2
(45) Date of Patent: Jan. 28, 2025

(54) GENERATION OF REFLECTANCE MAPS FOR RELIGHTABLE 3D MODELS

(71) Applicants: SONY GROUP CORPORATION, Tokyo (JP); SONY CORPORATION OF AMERICA, New York, NY (US)

(72) Inventors: Chen Fu, San Jose, CA (US); Mohammad Gharavi-Alkhansari, San Jose, CA (US)

(73) Assignees: SONY GROUP CORPORATION, Tokyo (JP); SONY CORPORATION OF AMERICA, New York, NY (US)

( * ) Notice: Subject to any disclaimer, the term of this patent is extended or adjusted under 35 U.S.C. 154(b) by 107 days.

(21) Appl. No.: 17/965,425

(22) Filed: Oct. 13, 2022

(65) Prior Publication Data
US 2024/0127529 A1    Apr. 18, 2024

(51) Int. Cl.
*G06T 15/50* (2011.01)
*G06T 15/04* (2011.01)
*G06T 17/20* (2006.01)

(52) U.S. Cl.
CPC ............ *G06T 15/506* (2013.01); *G06T 15/04* (2013.01); *G06T 17/20* (2013.01)

(58) Field of Classification Search
CPC ....... G06T 15/506; G06T 15/04; G06T 15/00; G06T 15/60; G06T 15/80; G06T 17/205; G06T 17/20; G06T 11/001; G06F 3/011; G06F 3/016; G01B 11/245
See application file for complete search history.

(56) References Cited

U.S. PATENT DOCUMENTS

| 9,123,116 | B2 | 9/2015 | Debevec et al. |
| 9,317,952 | B2* | 4/2016 | Koniaris ................. G06T 15/04 |
| 9,911,220 | B2* | 3/2018 | Corazza ................. G06T 15/04 |
| 10,469,831 | B2 | 11/2019 | Debevec et al. |
| 10,796,480 | B2* | 10/2020 | Chen .................... G06V 40/166 |
| 11,238,650 | B2* | 2/2022 | Li ............................. G06T 7/74 |
| 11,581,020 | B1* | 2/2023 | Hadap ................. G11B 27/036 |
| 11,582,519 | B1* | 2/2023 | Bhat .................. H04N 21/4666 |

(Continued)

OTHER PUBLICATIONS

Nehab, et al., "Efficiently combining positions and normals for precise 3D geometry", ACM Transactions on Graphics (TOG) 24.3, Aug. 2005, pp. 536-543.

(Continued)

*Primary Examiner* — Vijay Shankar
(74) *Attorney, Agent, or Firm* — CHIP LAW GROUP

(57) ABSTRACT

An electronic device and method for generation of reflectance maps for relightable 3D models is disclosed. The electronic device acquires multi-view image data that includes a set of images of an object and generates a 3D mesh of the object based on the multi-view image data. The electronic device obtains a set of motion-corrected images based on a minimization of a rigid motion associated with the object between images of the set of images and generates texture maps in a UV space based on the set of motion-corrected images and the 3D mesh. The electronic device obtains specular and diffuse reflectance maps based on a separation of specular and diffuse reflectance components from the texture maps, and obtains a relightable 3D model of the object based on the specular and diffuse reflectance maps.

20 Claims, 7 Drawing Sheets

(56) References Cited

U.S. PATENT DOCUMENTS

| | | |
|---|---|---|
| 2005/0276441 A1 | 12/2005 | Debevec |
| 2016/0261850 A1 | 9/2016 | Debevec |
| 2020/0020149 A1 | 1/2020 | Moltaji |
| 2022/0092293 A1 | 3/2022 | Riviere et al. |
| 2022/0130111 A1* | 4/2022 | Martin Brualla ......... G06T 7/40 |
| 2023/0027890 A1* | 1/2023 | Zhao ....................... G06T 15/10 |
| 2023/0077187 A1* | 3/2023 | Zafeiriou .............. G06T 3/4053 |

OTHER PUBLICATIONS

Weinzaepfel, et al., "DeepFlow: Large displacement optical flow with deep matching", ICCV—IEEE International Conference on Computer Vision, Sydney, Australia, Dec. 2013, pp. 1385-1392.

Ashburner John et al: "Rigid Body Registration", In "Statistical Parametric Mapping", Jan. 1, 2007, Elsevier, XP093063812, pp. 1-24.

Chloe Legendre: "Compositing Real and Virtual Objects with Realistic, Color-Accurate Illumination", Dissertation, Jan. 1, 2019, pp. 1-204, XP055648669.

Fyffe Graham et al: "Single-Shot Reflectance Measurement from Polarized Color Gradient Illumination", 2015 IEEE International Conference on Computational Photography (ICCP), IEEE, Apr. 24, 2015, pp. 1-10, XP033183083.

Ghosh Abhijeet et al: "Multiview Face Capture using Polarized Spherical Gradient Illumination", Siggraph Asia 2013 Computer Animation Festival, ACM, Dec. 12, 2011, pp. 1-10, XP059156444.

* cited by examiner

GENERATION OF REFLECTANCE MAPS FOR RELIGHTABLE 3D MODELS

REFERENCE

None

FIELD

Various embodiments of the disclosure relate to 3D modeling. More specifically, various embodiments of the disclosure relate to an electronic device and method for generation of reflectance maps for relightable 3D models.

BACKGROUND

Advancements in the field of three-dimensional (3D) computer graphics have provided the ability to create 3D models and visualize real objects in a 3D computer graphics environment. A 3D model is a static 3D mesh that resembles the shape of a particular object. Typically, such a 3D model is manually designed by computer graphics artists, commonly known as modelers, by use of a modeling software application. Such a 3D model may not be used in the same way in animation, or various virtual reality systems or applications. Texture mapping is an important method of defining texture details to be applied on the 3D model to texture the 3D model. Creating realistic 3D models and high-fidelity texture/reflectance maps have been a difficult problem in computer graphics and computer vision. With increasing applications in areas of virtual reality, 3D human avatar, gaming, and virtual simulation, generating accurate and high-fidelity texture or reflectance maps and imparting photorealism to a 3D model has become increasingly important.

Limitations and disadvantages of conventional and traditional approaches will become apparent to one of skill in the art, through comparison of described systems with some aspects of the present disclosure, as set forth in the remainder of the present application and with reference to the drawings.

SUMMARY

An electronic device and method for generation of reflectance maps for relightable 3D models is provided substantially as shown in, and/or described in connection with, at least one of the figures, as set forth more completely in the claims.

These and other features and advantages of the present disclosure may be appreciated from a review of the following detailed description of the present disclosure, along with the accompanying figures in which like reference numerals refer to like parts throughout.

DETAILED DESCRIPTION

The following described implementation may be found in the electronic device and method for generation of reflectance maps for relightable 3D models. Exemplary aspects of the disclosure may provide an electronic device (for example, a server, a desktop, a laptop, or a personal computer) that may execute operations to generate reflectance maps for relightable 3D models. The electronic device may acquire multi-view image data that includes a set of images of an object. The object may be exposed to a set of lighting patterns (for example, omni-directional lighting patterns, polarized, and/or gradient lighting patterns) within a capture duration of the multi-view image data. The electronic device may generate a 3D mesh of the object based on the multi-view image data and may obtain a set of motion-corrected images based on a minimization of a rigid motion associated with the object between images of the set of images. The electronic device may generate texture maps in a UV space based on the set of motion-corrected images and the 3D mesh. The electronic device may obtain specular and diffuse reflectance maps based on a separation of specular and diffuse reflectance components from the texture maps. The electronic device may obtain a relightable 3D model of the object based on the specular and diffuse reflectance maps.

Typically, a 3D model may be manually designed by computer graphics artists, commonly known as modelers, by use of a modeling software application. Such a 3D model may not be used in the same way in animation, or various virtual reality systems or applications and texture mapping may be used for defining texture details to be applied on the 3D model to texture the 3D model. Creating a realistic model and a texture map has been a difficult problem in fields of computer graphics and computer vision. Also, Estimation of full-head skin reflectance is key to generating relightable 3D head models for photo-realistic game and movie creation.

In order to address the requirements, the present disclosure introduces a method of generating high quality and high-resolution skin reflectance maps, including diffuse, specular, color, normal and height maps for objects such as 3D head scans using polarized spherical gradient lighting patterns. The present disclosure further introduces a robust diffuse and specular separation method that allows cameras to be positioned further from the equator of the light cage. The present disclosure further introduces operations to generate a color map to match the unpolarized scanning results and a pipeline to generate and refine normal maps. The present disclosure further introduces a fast color correction method, and operations to perform quick between-frame motion correction.

Figure 1:
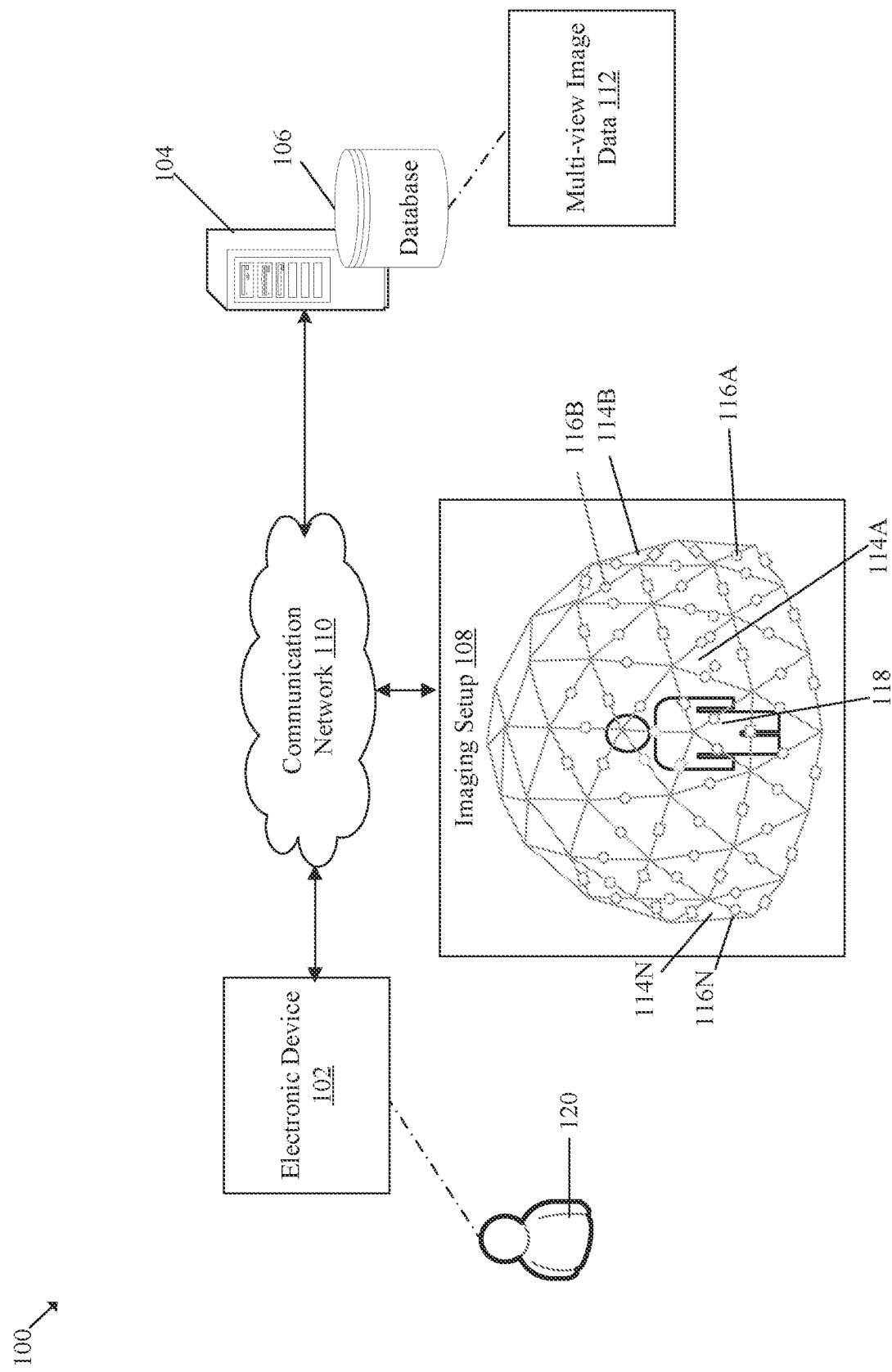
FIG. 1 is a block diagram that illustrates an exemplary network environment for generation of reflectance maps for relightable 3D models, in accordance with an embodiment of the disclosure.

FIG. 1 is a block diagram that illustrates an exemplary network environment for generation of reflectance maps for relightable 3D models, in accordance with an embodiment of the disclosure. With reference to FIG. 1, there is shown a network environment 100. The network environment 100 may include an electronic device 102, a server 104, a database 106, an imaging setup 108, and a communication network 110. The database 106 may include a multi-view image data 112. The imaging setup 108 may include a first structure 114A, a second structure 114B, and an Nth structure 114N.

With reference to FIG. 1, there is further shown a plurality of image-capture devices 116 that may be installed on a 3D cage structure that includes the first structure 114A, the second structure 114B, and the Nth structure 114N. The plurality of image-capture devices 116 may include, for example, a first image-capture device 116A, a second image-capture device 116B, and an Nth image-capture device 116N. The electronic device 102 and the server 104 may be communicatively coupled to one another, via the communication network 110. In FIG. 1, there is further shown an object (e.g., an actor 118) and a user 120 (e.g., a 3D artist or a developer) who may be associated with the electronic device 102.

The electronic device 102 may include suitable logic, circuitry, interfaces, and/or code that may be configured to acquire multi-view image data 112 that includes a set of images of an object (such as the actor 118). Based on the image data, the electronic device 102 may execute a set of operations to generate a set of reflectance maps that may be required to obtain a relightable 3D model of the object. The object may be exposed to a set of lighting patterns within a capture duration of the multi-view image data. Examples of the electronic device 102 may include, but are not limited to, a computing device, a smartphone, a cellular phone, a mobile phone, a gaming device, a mainframe machine, a server, a computer workstation, and/or a consumer electronic (CE) device.

The server 104 may include suitable logic, circuitry, and interfaces, and/or code that may be configured to execute operations, such as data/file storage, 3D rendering, or 3D reconstruction operations (such as a photogrammetric reconstruction operation). In one or more embodiments, the server 104 may store the multi-view image data and may execute at least one operation associated with the electronic device 102. The server 104 may be implemented as a cloud server and may execute operations through web applications, cloud applications, HTTP requests, repository operations, file transfer, and the like. Other example implementations of the server 104 may include, but are not limited to, a database server, a file server, a web server, a media server, an application server, a mainframe server, or a cloud computing server.

In at least one embodiment, the server 104 may be implemented as a plurality of distributed cloud-based resources by use of several technologies that are well known to those ordinarily skilled in the art. A person with ordinary skill in the art will understand that the scope of the disclosure may not be limited to the implementation of the server 104 and the electronic device 102, as two separate entities. In certain embodiments, the functionalities of the server 104 can be incorporated in its entirety or at least partially in the electronic device 102 without a departure from the scope of the disclosure. In certain embodiments, the server 104 may host the database 106. Alternatively, the server 104 may be separate from the database 106 and may be communicatively coupled to the database 106.

The database 106 may include suitable logic, interfaces, and/or code that may be configured to store the multi-view image data 112 or metadata associated with the multi-view image data 112. For example, the metadata may include an identifier of an image-capture device that captures an image, a lighting pattern used at the time of capture, or an identifier of a viewpoint from where the image is captured, or an index value to indicate a position of the image within the set of images (included in the multi-view image data 112). The database 106 may be stored or cached on a device, such as a server (e.g., the server 104) or the electronic device 102. The device storing the database 106 may be configured to receive a query for the multi-view image data 112 or the metadata. In response, the device that stores the database 106 may retrieve and provide the multi-view image data 112 or the metadata to the electronic device 102.

In some embodiments, the database 106 may be hosted on a plurality of servers stored at same or different locations. The operations of the database 106 may be executed using hardware, including a processor, a microprocessor (e.g., to perform or control performance of one or more operations), a field-programmable gate array (FPGA), or an application-specific integrated circuit (ASIC). In some other instances, the database 106 may be implemented using software.

The imaging setup 108 may correspond to a 3D cage structure onto which the plurality of image-capture devices 116 may be disposed and oriented to scan the object inside the 3D cage structure from a plurality of viewpoints. The imaging setup 108 may include the plurality of structures 114, each of which may be connected at certain locations to form a cage-like structure (e.g., a 3D dome structure as shown). The present disclosure may not be limited to any particular shape of the 3D cage structure. In some embodiments, the shape of the cage-like structure may be cylindrical, cuboidal, or any arbitrary share, depending on the requirement of the volumetric studio/capture. In some embodiments, each of the plurality of structures 114 may have the same or different dimensions depending on the requirement of the volumetric studio/capture. In addition to the plurality of image-capture devices 116, a plurality of audio capture devices (not shown), and/or a plurality of light sources (not shown) may be disposed at certain locations on the plurality of structures 114 to form the imaging setup 108.

By way of example, and not limitation, each structure may include a mount to hold at least one image-capture device (represented by a circle in FIG. 1) and at least one processing device. As shown in FIG. 1, each structure (e.g., a truss) may include a frame of a particular material (e.g., metal, plastic, or fiber) to hold at least one of an image-capture device, a processing device, an audio-capture device, and a light source (e.g., a flash). Different 3D structures of same or different shapes can be connected to form the imaging setup 108. In an embodiment, the processing device may be the electronic device 102.

In some embodiments, a movable imaging setup may be created. In such an implementation, each of the plurality of structures 114 of the movable imaging setup may correspond to an unmanned aerial vehicle (UAV) and the plurality of image-capture devices 116, the plurality of light sources, and/or other devices may be mounted on a plurality of unmanned aerial vehicles (UAVs).

The communication network 110 may include a communication medium through which the electronic device 102 and the server 104 may communicate with one another. The communication network 110 may be one of a wired connection or a wireless connection. Examples of the communication network 110 may include, but are not limited to, the Internet, a cloud network, Cellular or Wireless Mobile Network (such as Long-Term Evolution and $5^{th}$ Generation (5G) New Radio (NR)), a Wireless Fidelity (Wi-Fi) network, a Personal Area Network (PAN), a Local Area Network (LAN), or a Metropolitan Area Network (MAN). Various devices in the network environment 100 may be configured to connect to the communication network 110 in accordance with various wired and wireless communication protocols. Examples of such wired and wireless communication protocols may include, but are not limited to, at least one of a Transmission Control Protocol and Internet Protocol (TCP/IP), User Datagram Protocol (UDP), Hypertext Transfer Protocol (HTTP), File Transfer Protocol (FTP), Zig Bee, EDGE, IEEE 802.11, light fidelity (Li-Fi), 802.16, IEEE 802.11s, IEEE 802.11g, multi-hop communication, wireless access point (AP), device to device communication, cellular communication protocols, and Bluetooth (BT) communication protocols.

In operation, the electronic device 102 may be configured to acquire the multi-view image data 112 that includes a set of images of an object (such as the actor 118). The object may be exposed to a set of lighting patterns within a capture duration of the multi-view image data 112. By way of example, and not limitation, the set of lighting patterns may include one or more of a cross-polarized omni-directional lighting pattern, gradient lighting patterns, and polarized lighting patterns, including a cross-polarized lighting pattern and a parallel-polarized lighting pattern.

In an exemplary embodiment, the object may be a human head (with face) and the multi-view image data 112 may be acquired from the imaging setup 108 that may operate as a polarization-based light cage. The object may be scanned via one or more cameras of the imaging setup 108 from a plurality of viewpoints to obtain the multi-view image data 112. In order to obtain high-fidelity reflectance and normal/height maps for object, the object must be exposed to different lighting patterns while capturing images of the object from different viewpoints. Details related to the multi-view image data 112 are further provided, for example, in FIG. 3A.

The electronic device 102 may be configured to generate a 3D mesh of the object based on the multi-view image data 112. By way of example, and not limitation, the 3D mesh may be generated from the set of images using a photogrammetry-based method (such as structure from motion (SfM)), a method which requires stereoscopic images, or a method which requires monocular cues (such as shape from shading (SfS), photometric stereo, or shape from texture (SfT)). Details of such methods have been omitted from the disclosure for the sake of brevity. The 3D mesh may be an untextured mesh that resembles the 3D shape of the object. The 3D mesh may use polygons to define the shape or the geometry of the object. An example 3D mesh for a human head is provided, for example, in FIG. 3A.

When the object is scanned to capture the set of images, the object may need to stay still throughout the scanning phase. However, there may be some unavoidable movement (e.g., head movement) of the object. Actual between-frame movement may be assumed to be small. The rigid motion may be estimated and removed by performing patch matching between images or frames to obtain a set of motion-corrected images. Specifically, the electronic device 102 may obtain the set of motion-corrected images based on a minimization of the rigid motion associated with the object between images of the set of images. Details related to the set of motion-corrected images are further provided, for example, at 306 in FIG. 3A.

In some instances, it may be necessary to perform color correction of the motion-corrected images to acquire accurate albedo values for both diffuse and specular components. Therefore, a color-correction may be applied on a subset of images of the set of motion-corrected images to obtain a set of color-corrected images.

In order to obtain a relightable 3D model, specular and diffuse components may need to be separated from the images to obtain albedo for the 3D mesh. Accuracy of the separation typically drops with an increase in camera views. Therefore, texture maps may be generated in UV space and the diffuse and specular separation may then be performed in the UV space. The electronic device 102 may generate texture maps in the UV space based on the set of motion-corrected images (or the color-corrected images) and the 3D mesh. The texture maps may help in including high frequency details of the object on to a 3D model of the object and such maps may be obtained based on a mapping of the set of motion-corrected images to the UV space. Examples of the texture map may include a cross-polarization UV texture map and a parallel-polarized UV texture map. Details related to the texture maps are further provided, for example, at 308 in FIG. 3B.

The electronic device 102 may obtain specular and diffuse reflectance maps based on the separation of specular and diffuse reflectance components from the texture maps. The specular reflectance map may depict shininess of a surface of the object and the diffuse reflectance map may depict reflection from the object without any atmospheric reflection. The specular and diffuse reflectance components may be separated from each of the texture maps, i.e., the cross-polarization UV texture map and the parallel-polarized UV texture map. Details related to the specular and diffuse reflectance maps are provided, for example, in FIG. 3B.

The electronic device 102 may further obtain a relightable 3D model of the object based on the specular and diffuse reflectance maps. The relightable 3D model may be a static 3D mesh that resembles the shape of the object (e.g., head of the actor 118). Details related to the relightable 3D model are provided, for example, at 314 in FIG. 3B.

Figure 2:
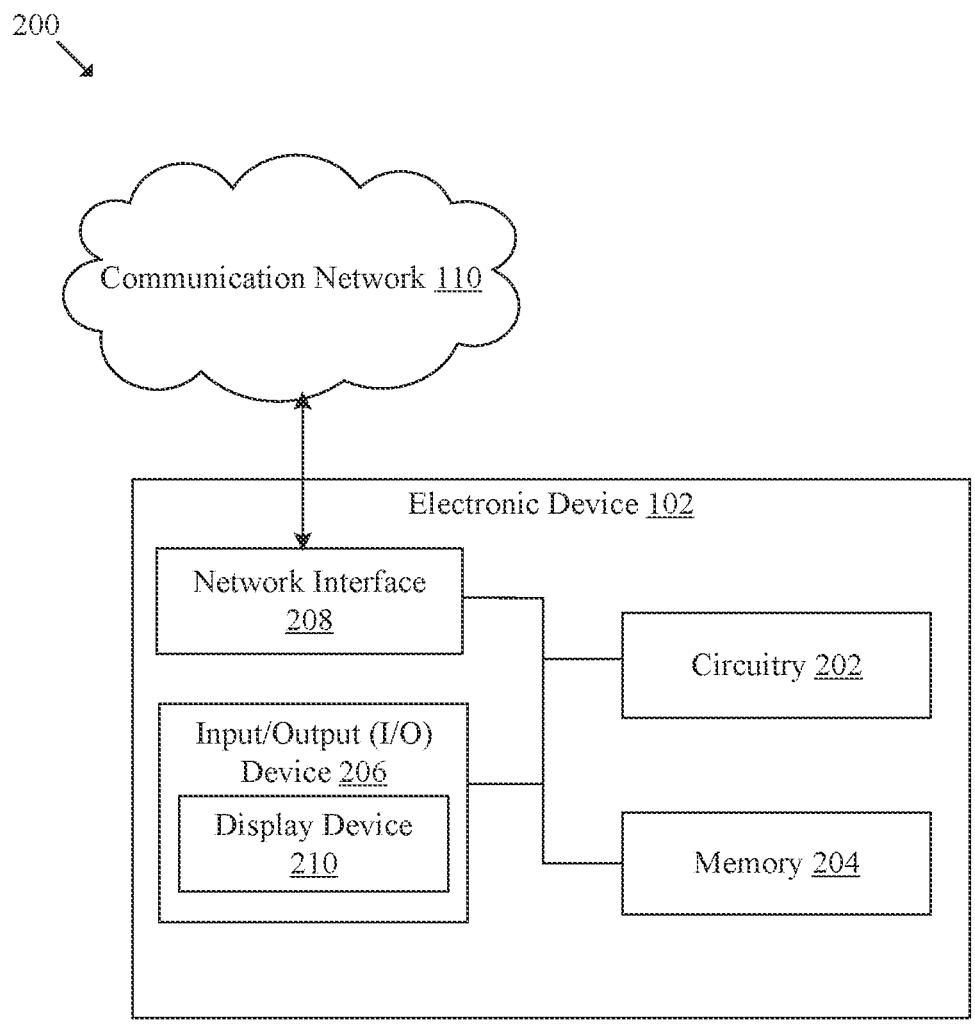
FIG. 2 is a block diagram that illustrates an exemplary electronic device of FIG. 1, in accordance with an embodiment of the disclosure.

FIG. 2 is a block diagram that illustrates an exemplary electronic device of FIG. 1, in accordance with an embodiment of the disclosure. FIG. 2 is explained in conjunction with elements from FIG. 1. With reference to FIG. 2, there is shown the electronic device 102. The electronic device 102 may include circuitry 202, a memory 204, an input/output (I/O) device 206, and a network interface 208. The input/output (I/O) device 206 may include a display device 210.

The circuitry 202 may include suitable logic, circuitry, and/or interfaces that may be configured to execute program instructions associated with different operations to be executed by the electronic device 102. The circuitry 202 may include one or more processing units, which may be implemented as a separate processor. In an embodiment, the one or more processing units may be implemented as an integrated processor or a cluster of processors that perform the functions of the one or more specialized processing units, collectively. The circuitry 202 may be implemented based on a number of processor technologies known in the art. Examples of implementations of the circuitry 202 may be an X86-based processor, a Graphics Processing Unit (GPU), a Reduced Instruction Set Computing (RISC) processor, an Application-Specific Integrated Circuit (ASIC) processor, a Complex Instruction Set Computing (CISC) processor, a microcontroller, a central processing unit (CPU), and/or other control circuits.

The memory 204 may include suitable logic, circuitry, interfaces, and/or code that may be configured to store one or more instructions to be executed by the circuitry 202. The memory 204 may be configured to store multi-view image data. Examples of implementation of the memory 204 may include, but are not limited to, Random Access Memory (RAM), Read Only Memory (ROM), Electrically Erasable Programmable Read-Only Memory (EEPROM), Hard Disk Drive (HDD), a Solid-State Drive (SSD), a CPU cache, and/or a Secure Digital (SD) card.

The I/O device 206 may include suitable logic, circuitry, interfaces, and/or code that may be configured to receive an input and provide an output based on the received input. For example, the I/O device 206 may receive the first user input indicative of the selection of the multi-view image data 112. The I/O device 206 may be further configured to display the set of images included in the multi-view image data 112. The I/O device 206 may include the display device 210. Examples of the I/O device 206 may include, but are not limited to, a touch screen, a keyboard, a mouse, a joystick, a microphone, or a speaker.

The network interface 208 may include suitable logic, circuitry, interfaces, and/or code that may be configured to facilitate communication between the electronic device 102 and the server 104 via the communication network 110. The network interface 208 may be implemented by use of various known technologies to support wired or wireless communication of the electronic device 102 with the communication network. The network interface 208 may include, but is not limited to, an antenna, a radio frequency (RF) transceiver, one or more amplifiers, a tuner, one or more oscillators, a digital signal processor, a coder-decoder (CODEC) chipset, a subscriber identity module (SIM) card, or a local buffer circuitry.

The network interface 208 may be configured to communicate via wireless communication with networks, such as the Internet, an Intranet, a wireless network, a cellular telephone network, a wireless local area network (LAN), or a metropolitan area network (MAN). The wireless communication may be configured to use one or more of a plurality of communication standards, protocols and technologies, such as Global System for Mobile Communications (GSM), Enhanced Data GSM Environment (EDGE), wideband code division multiple access (W-CDMA), Long Term Evolution (LTE), 5$^{th}$ Generation (5G) New Radio (NR), code division multiple access (CDMA), time division multiple access (TDMA), Bluetooth, Wireless Fidelity (Wi-Fi) (such as IEEE 802.11a, IEEE 802.11b, IEEE 802.11g or IEEE 802.11n), voice over Internet Protocol (VoIP), light fidelity (Li-Fi), Worldwide Interoperability for Microwave Access (Wi-MAX), a protocol for email, instant messaging, and a Short Message Service (SMS).

The display device 210 may include suitable logic, circuitry, and interfaces that may be configured to display a set of images included in the multi-view image data 112 and/or the 3D mesh. The display device 210 may be a touch screen which may enable a user (e.g., the user 120) to provide a user-input via the display device 210. The touch screen may be at least one of a resistive touch screen, a capacitive touch screen, or a thermal touch screen. The display device 210 may be realized through several known technologies such as, but not limited to, at least one of a Liquid Crystal Display (LCD) display, a Light Emitting Diode (LED) display, a plasma display, or an Organic LED (OLED) display technology, or other display devices. In accordance with an embodiment, the display device 210 may refer to a display screen of a head mounted device (HMD), a smart-glass device, a see-through display, a projection-based display, an electro-chromic display, or a transparent display. Various operations of the circuitry 202 for generation of reflectance maps for relightable 3D models are described further, for example, in FIGS. 3A and 3B.

Figure 3A:
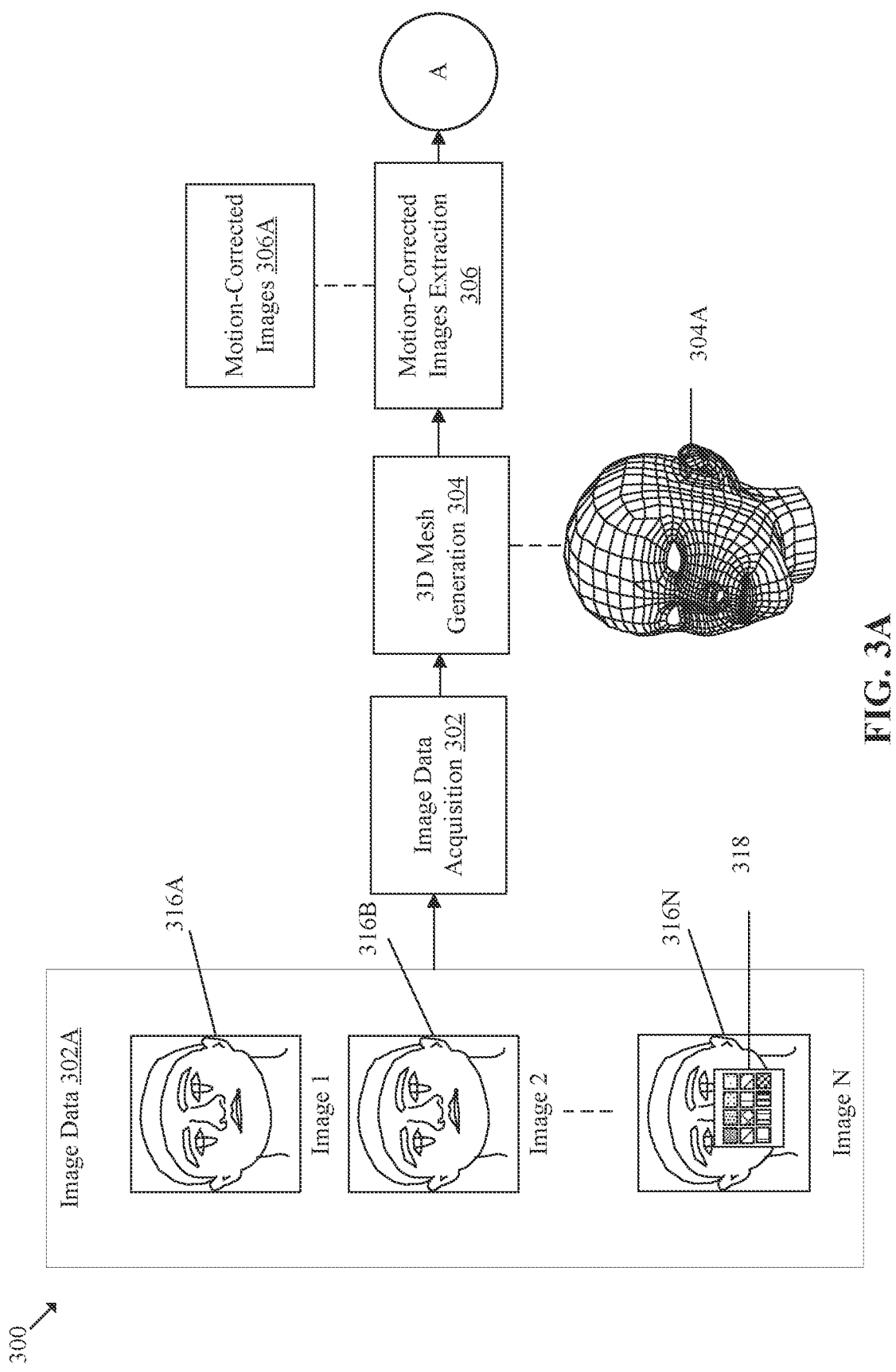
FIGS. 3A and 3B are collectively diagrams that illustrates an exemplary processing pipeline for generation of reflectance maps, in accordance with an embodiment of the disclosure.
Figure 3B:
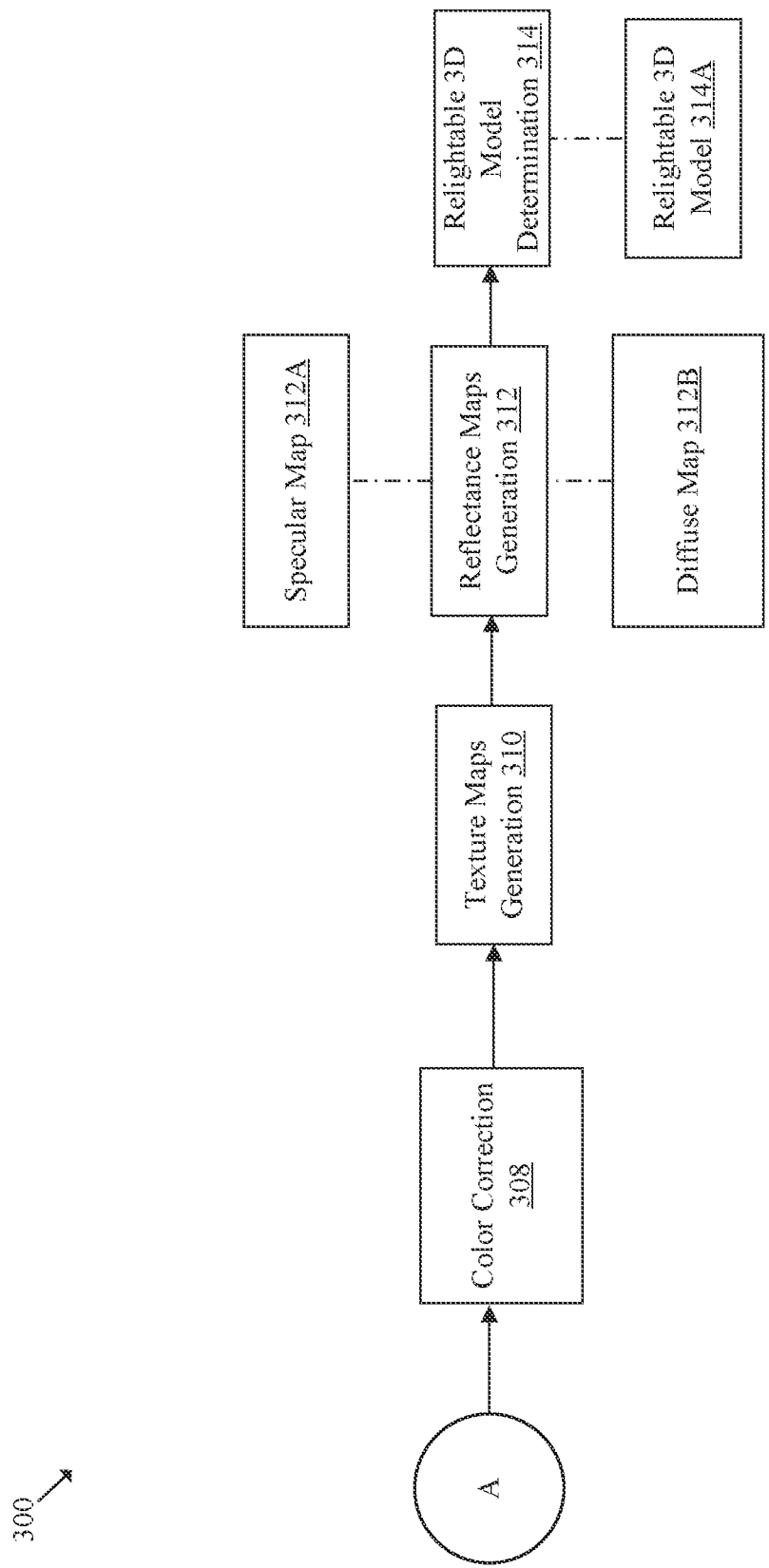

FIGS. 3A and 3B are diagrams that collectively illustrate an exemplary processing pipeline for generation of reflectance maps, in accordance with an embodiment of the disclosure. FIGS. 3A and 3B are explained in conjunction with elements from FIG. 1 and FIG. 2. With reference to FIGS. 3A and 3B, there is shown an exemplary processing pipeline 300 that illustrates exemplary operations from 302 to 314. The exemplary operations 302 to 314 may be executed by any computing system, for example, by the electronic device 102 of FIG. 1 or by the circuitry 202 of FIG. 2. The exemplary processing pipeline 300 further illustrates multi-view image data 302A, a 3D mesh 304A, a set of motion-corrected images 306A, a specular reflectance map 312A, a diffusion reflectance map 312B, and a relightable 3D model 314A. The multi-view image data 302A may include N number of images such as an image 316A, an image 316B, and an image 316N. The image 316N includes a color checker image 318 along with the face or the head of the object. The number of images shown in FIG. 3A is presented merely as an example and such an example should not be construed as limiting the disclosure.

At 302, a multi-view image data acquisition may be performed. The circuitry 202 may acquire the multi-view image data 302A that includes a set of images of the object. The object may be exposed to a set of lighting patterns within a capture duration of the multi-view image data 302A. The object may be any animate or inanimate object. An example of the object as a human head is shown in FIG. 3A. One or more cameras may scan the object to capture one or more images from each viewpoint while the object is exposed to the set of lighting patterns within the capture duration. From each camera view, multiple images of the object may be captured. The electronic device 102 may receive a set of images (i.e., multi-view high-resolution images) from the one or more cameras. The set of images may include image(s) with different lighting patterns and viewpoints.

In an embodiment, the object may be a human head and the multi-view image data 302A may be acquired from an imaging setup (e.g., the imaging setup 108) that operates as a polarization-based light cage. The light cage may be, for example, a dome-shaped cage structure that may include a number of movable or static lighting devices and one or more image-capture devices placed at different locations on the cage structure. The lighting devices may emit different lighting patterns based on one or more control signals from the electronic device 102 or from a standalone controller device. In case of the polarization-based light cage, the lighting devices may emit polarized light (cross or parallel polarization). The object, i.e., the actor may be seated at the center of the light cage and each image-capture device may capture images of the human head while the human head is exposed to the set of lighting patterns. For example, the object may be an actor and the one or more image-capture devices may capture the set of images of the actor's head under different lighting patterns.

In an embodiment, the set of lighting patterns may include one or more of a cross-polarized omni-directional lighting pattern, gradient lighting patterns, and polarized lighting patterns, including a cross-polarized lighting pattern and a parallel-polarized lighting pattern. In an embodiment, the set of lighting patterns may include a minimal of six polarized gradient lighting patterns, including cross-polarization lighting pattern and parallel polarization lighting pattern under three axis, i.e., 'X' axis, 'Y' axis, and 'Z' axis. In some instances, it may be preferable to use nine gradient lighting patterns may provide better quality normal generation than using a minimal of six or a maximal of twelve, without performing motion correction.

At 304, a 3D mesh may be generated. The circuitry 202 may be configured to generate the 3D mesh 304 of the object based on the multi-view image data 302A. The 3D mesh 304 may be an untextured base mesh that may be used in operations associated with generation of the texture, reflectance, or normal/height maps of the object. As discussed, the 3D mesh may be generated from the set of images using the photogrammetry-based method (such as structure from motion (SfM)), the method which requires stereoscopic images, or the method which requires monocular cues (such as shape from shading (SfS), photometric stereo, or shape from texture (SfT)). Details of such methods have been omitted from the disclosure for the sake of brevity.

At 306, a set of motion-corrected images may be generated. In many instances, the object may not remain still throughout a duration of capture of the set of images. For example, the object may be actor's head whose images may be captured. Head movements may not be avoidable in the duration of capture. Typically, rigid motion may be estimated and removed based on estimation and alignment of 3D positions of markers or coded targets placed on a cap (worn by the actor). However, many studios prefer to capture images of the actor with hair (i.e., without the cap). In such a situation, coded targets or markers may not be suitable. If it is assumed that the object stays still for at least one second, then actual between-frame movement may be assumed to be miniscule. The rigid motion may be removed by performing patch matching between images to obtain the set of motion-corrected images 306A. The circuitry 202 may be configured to obtain the set of motion-corrected images 306A based on a minimization of the rigid motion between images of the set of images.

At 308, a color correction may be executed. The circuitry 202 may be configured to acquire a colored checker image that may be exposed to a cross-polarized omni-directional lighting pattern. The circuitry 202 may estimate a color matrix based on a comparison of color values of the color checker image 308A with reference color values. The circuitry 202 may apply the estimated color matrix on a subset of images of the set of motion-corrected images 306A to obtain a set of color-corrected images. The subset of images may be associated with one of an omni-directional cross-polarization lighting pattern or a parallel polarization lighting pattern.

Typically, for reflectance map generation, specular and diffuse reflectance components may be separated directly from input images (e.g., from cross-polarization (q) and parallel polarization (q) images) to generate view dependent specular and diffuse reflectance components for every camera view. Each of the specular and diffuse reflectance components may be mapped to the UV space to generate texture maps. The above-mentioned processing order may rely heavily on accuracy of polarization separation. Unfortunately, the accuracy of the polarization separation may drop with increase in camera views that may be far from the equator of the polarization-based light cage, thereby leading to view-dependent specular maps. As a result, the generated specular map may generally be noisy and sometimes with significant artifacts. Instead of above-mentioned approach, the present disclosure may first perform the UV mapping for multi-view cross-polarization and parallel polarization images and may then perform the diffuse and specular separation in the UV space, as described in 310 and 312, for example. This may generate higher quality reflectance maps.

At 310, texture maps may be generated. The circuitry 202 may generate the texture maps in the UV space based on the set of motion-corrected images and the 3D mesh. Alternatively, the texture maps may be generated based on the set of color-corrected images and the 3D mesh. By way of example, and not limitation, the 3D mesh may be unwrapped to a two-dimensional (2D) UV space to obtain a UV map. In a UV mapping operation, color values may be applied on the UV map, based on an affine transformation between a plurality of triangles of the 3D mesh in UV map and a corresponding plurality of triangles in the set of motion-corrected (or color-corrected) images. As the set of images includes one or more images captured under the cross-polarized lighting pattern and one or more images captured under the parallel-polarized lighting pattern, UV mapping may be performed for the multi-view cross-polarization and parallel polarization images. View-dependent specular component may be considered to be relatively small compared to the view-dependent color information. One or more images captured under the cross-polarized lighting pattern may be merged in the UV space to obtain a cross-polarization UV texture map. Further, one or more images captured under the parallel-polarized lighting pattern may be merged in the UV space to obtain a parallel-polarized UV texture map. The diffuse and specular separation may then be performed in the UV space using the texture maps, as described in 312.

At 312, reflectance maps may be obtained. The circuitry 202 may be configured to obtain the specular and diffuse reflectance maps 312A and 312B based on the separation of specular and diffuse reflectance components from the texture maps. More specifically, the specular and diffuse reflectance components may be separated from the cross-polarization UV texture map and the parallel-polarized UV texture map. While the specular reflectance map 312A may depict shininess of the surface of the object such as human skin, the diffuse reflectance maps 312B may depict reflection from the object without any atmospheric reflection. The separation of specular and diffuse reflectance components from the texture maps may enable generation of higher quality reflectance maps. Further, the above-mentioned approach may allow cameras to be placed at 45 degrees to 60 degrees away from an equator inside the polarization-based light cage, without generating polarization-related artifacts on albedos. Also, the cameras may need not be concentrated around equator for separation of specular and diffuse reflectance components from the texture maps.

The separated diffuse and specular components may contain ambient occlusion (AO) that may need to be removed to generate albedos. The ambient occlusion may be shadowing present in the set of images due to obstruction of points on the surface of the object from light sources. Certain points on the object may be obstructed from the light sources and shadows of such points may make certain portions of a relightable 3D model darker. Thus, the specular and diffuse reflectance maps 312A and 312B may not appear accurate. In accordance with an embodiment, the ambient occlusion may be roughly estimated from the 3D shape by path tracing operations. Specifically, a hemisphere of rays may be considered to originate from a given point and a path of each ray may be traced to check intersection of the ray with obstructions. Once the ambient occlusion is estimated, the ambient occlusion may be removed from the specular and diffuse reflectance maps 312A and 312B to obtain refined the specular and diffuse reflectance maps. In an embodiment, the circuitry 202 may be configured to estimate the AO based on a 3D shape of the 3D mesh 304A and refine the specular and diffuse reflectance maps 312A and 312B based on a removal of the ambient occlusion from the specular and diffuse reflectance maps 312A and 312B, respectively.

At 314, a relightable 3D model 314A may be obtained. The circuitry 202 may be configured to obtain the relightable 3D model 314A of the object based on the specular and diffuse reflectance maps 312A and 312B. The relightable 3D model 314A may be a model of the object in 3D that can be lit with lighting patterns different from the set of the light patterns under which the set of images are captured.

In an embodiment, the circuitry 202 may be further configured to generate a color map based on a linear combination of the specular and diffuse reflectance maps 312A and 312B. In certain situations, game and movie studios may prefer to maintain consistency in terms of color or contrast between the texture maps generated from the multi-view image data 302A (which is acquired from the imaging setup 108 (i.e., a polarization-based light cage) and a traditional 3D/4D scanning system using unpolarized lighting. However, the diffuse reflectance map 312B generated from the multi-view image data 302A may have less contrast and more saturated colors due to polarized lighting. Color matching using a colored checker image may not work in this situation due to the difference between a colored checker image (as shown in the image 316N) and the actor's skin. Thus, the color map $I^i_{Color}$ may be generated based on the linear combination of the specular reflectance map 312A and diffuse reflectance map 312B, as given by an equation (1):

$$I^i_{Color} = I^i_{Diffuse} + \lambda \times I^i_{specular} \quad (1)$$

wherein, $I^i_{Color}$ may be the color map, $I^i_{specular}$ may be the specular reflectance component and $I^i_{diffuse}$ may be diffuse reflectance components of the 3D surface point. $\lambda$ may be a constant. When $\lambda$ is 1, the linear combination of the specular reflectance maps 312A and diffuse reflectance maps 312B may match with the texture maps generated by employing the traditional 3D/4D scanning system using unpolarized lighting.

Figure 4:
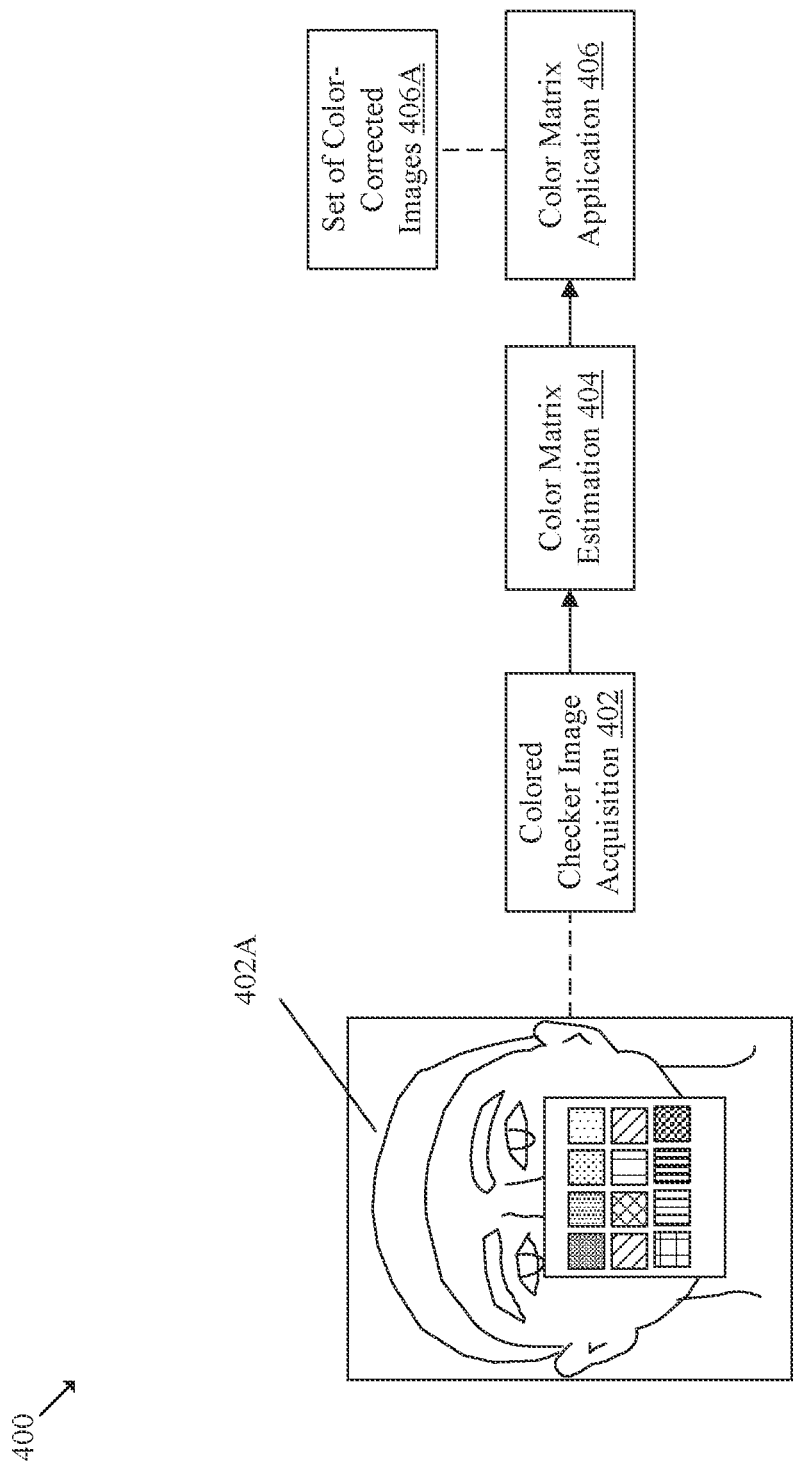
FIG. 4 is a diagram that illustrates an exemplary processing pipeline for obtaining a set of color-corrected images, in accordance with an embodiment of the disclosure.

FIG. 4 is a diagram that illustrates an exemplary processing pipeline for obtaining a set of color-corrected images, in accordance with an embodiment of the disclosure. FIG. 4 is explained in conjunction with elements from FIG. 1, FIG. 2, FIG. 3A, and FIG. 3B. With reference to FIG. 4, there is shown an exemplary processing pipeline 400 that illustrates exemplary operations from 402 to 406 for obtaining the set of color-corrected images. The exemplary operations 402 to 406 may be executed by any computing system, for example, by the electronic device 102 of FIG. 1 or by the circuitry 202 of FIG. 2. The exemplary processing pipeline 400 further illustrates a color checker image 402A and a set of color-corrected images 406A.

At 402, a colored checker image acquisition may be performed. The circuitry 202 may be configured to acquire the colored checker image 402A. The colored checker image 402A may be a x-rite color checker image that may be captured under omni-directional cross-polarization lighting. The colored checker image 402A may include various gradients of colors and may be used as a reference for color correction.

At 404, a color matrix estimation may be performed. Conventionally, the color correction for each image of the set of images may be performed using the colored checker image 402A. One image of the object may be captured with the colored checker image 402A. Colors of each image may be matched with the colored checker image 402A to balance out the color in each image of a set of images. However, this process may be generally slow for large scale image datasets, due to repeated color matrix estimation process, repeated file reading operations, and unnecessary color correction on certain frames. In contrast, the circuitry 202 may estimate the color matrix based on a comparison of color values of the color checker image 402A with reference color values. Values of each color in the color checker image 402A may be compared with the reference color values and the color matrix may be estimated using least square method. As an example, the color matrix may include three rows and three columns.

At 406, estimated color matrix application may be applied on a subset of images. The circuitry 202 may apply the estimated color matrix on only a subset of images of the set of motion-corrected images to obtain a set of color-corrected images. The subset of images may be associated with one of an omni-directional cross-polarization lighting pattern or a parallel polarization lighting pattern. Color correction may not be performed for other motion-corrected images associated with the polarized lighting patterns since a normal and height map generation process is largely uncorrelated with image color accuracy. By correcting a subset of images, time consumed in performing color correction may be less as compared to conventional approaches for color correction.

In an embodiment, the set of motion-corrected images including fourteen bits raw files that may be converted to sixteen bits de-mosaiced images to preserve a dynamic range. A linear color space may be chosen as the generation of normal and height maps may require linear intensity measurement.

Figure 5:
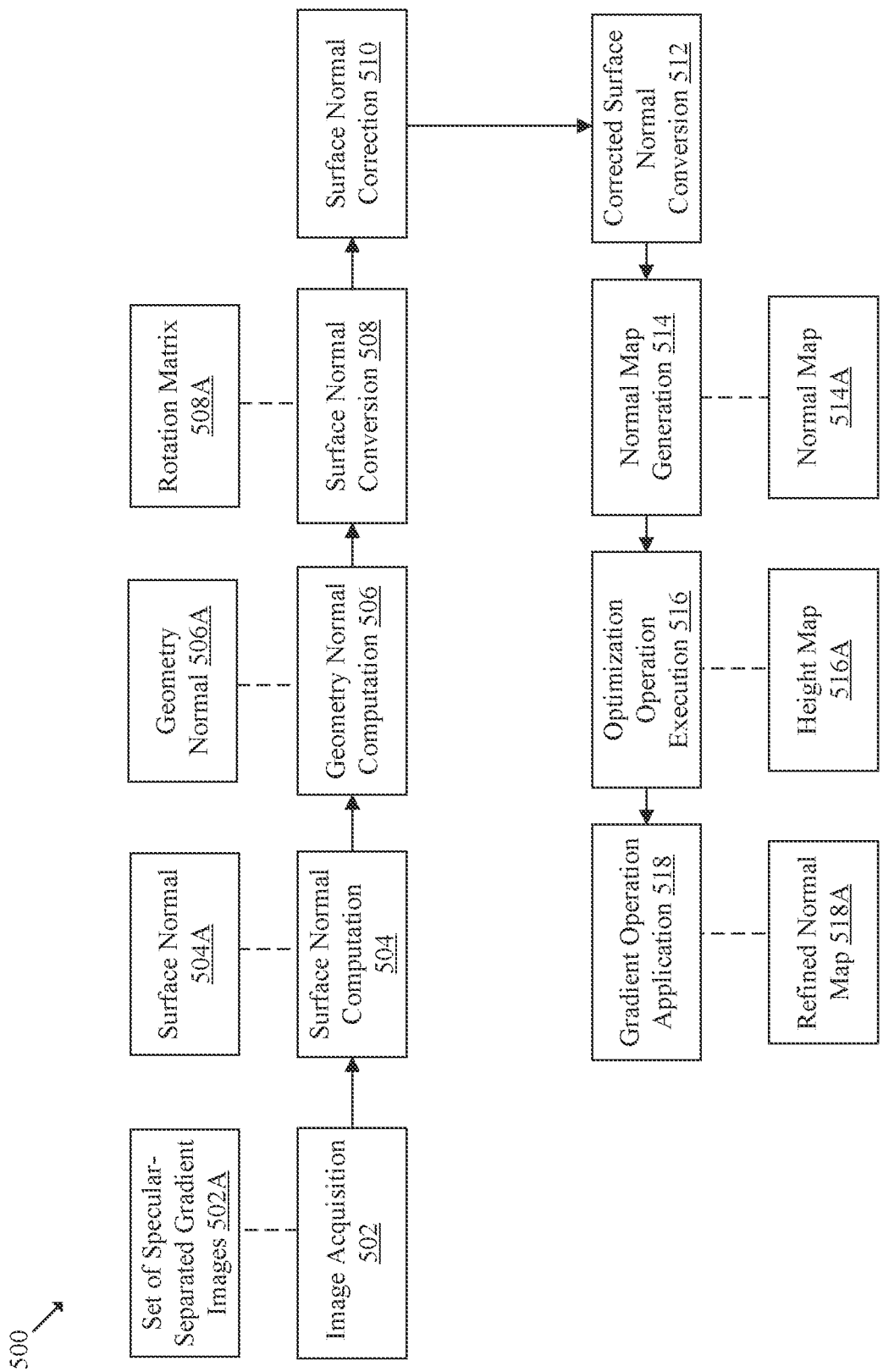
FIG. 5 is a diagram that illustrates an exemplary processing pipeline for generation of a refined normal map, in accordance with an embodiment of the disclosure.

FIG. 5 is a diagram that illustrates an exemplary processing pipeline for generation of a refined normal map, in accordance with an embodiment of the disclosure. FIG. 5 is explained in conjunction with elements from FIG. 1, FIG. 2, FIG. 3A, FIG. 3B, and FIG. 4. With reference to FIG. 5, there is shown an exemplary processing pipeline 500 that illustrates exemplary operations from 502 to 518 for generation of reflectance maps for relightable 3D models. The exemplary operations 502 to 514 may be executed by any computing system, for example, by the electronic device 102 of FIG. 1 or by the circuitry 202 of FIG. 2. The exemplary processing pipeline 500 further illustrates a set of specular-separated gradient images 502A, a surface normal 504A, a geometry normal 506A, a rotation matrix 508A, a normal map 514A, a height map 516A, and a refined normal map 518A.

At 502, specular-separated gradient images may be obtained. The circuitry 202 may be configured to obtain the set of specular-separated gradient images 502A based on a removal of the diffuse component from each image that may be associated with the gradient lighting pattern and may be included in the set of motion-corrected images (obtained in FIGS. 1 and 3A-3B). While the diffuse component may be removed from each image that is associated with the gradient lighting pattern and is included in the set of motion-corrected images, the specular component may be retained in each image associated with the gradient lighting pattern.

At 504, a surface normal computation may be performed. The circuitry 202 may be further configured to compute the surface normal 504A corresponding to each pixel of the image of the set of specular-separated gradient images 502A. The surface normal 504A may be a vector perpendicular to a given pixel of the image of the set of specular-separated gradient images 502A. The computed surface normal 504A may contain much finer micro-geometry details. However, the computed surface normal 504A may be in a world-space which may not correspond to a mesh space of the 3D mesh. Further, the computed surface normal 504A may have a non-uniform low-frequency bias due to a nature of photometric based normal estimation. Thus, the computed surface normal 504A may need to be converted from a world-space to an object space. Further, the converted surface normal may be corrected based on a removal of a low frequency bias from the converted surface normal.

At 506, a geometry normal computation may be performed. The circuitry 202 may be configured to compute the geometry normal 506A based on a linear combination of the set of vertex normals corresponding to the 3D mesh. The combination may be performed based on barycentric coordinates of each pixel of the generated texture maps in the UV space. The barycentric coordinates may define location of each pixel of the generated texture maps in the UV space with respect to a reference triangle or a tetrahedron. The geometry normal 506A may have the same level of geometry details as that of the 3D mesh.

At 508, a surface normal conversion may be performed. The circuitry 202 may be configured to convert the surface normal 504A from the world-space to the object space based on application of the rotation matrix 508A on the surface normal 504A. The surface normal 504A may be in the world-space (i.e., 'X' axis, 'Y' axis and 'Z' axis of the set of lightning patterns) and may include finer micro-geometry details of the object. Since the surface normal 504A is in the world-space (which does not correspond to the mesh space (i.e., 3D mesh space)), the surface normal 504A may have to be converted from the world-space to the object space. The rotation matrix 508A may thus be required to convert the surface normal 504A from the world-space to the object space.

In an embodiment, the circuitry 202 may be configured to estimate the rotation matrix 508A based on application of a least-square difference operation on a gaussian-filtered surface normal and the geometry normal 506A. In order to obtain the gaussian-filtered surface normal, the surface normal 504A may be first passed through a gaussian-filter. The finer micro-geometry details of the surface normal 504A may be removed by the gaussian-filter. The gaussian-filtered surface normal may be smooth and may not include low frequency bias. Since the geometry normal 506A may contain less geometry details as compared to the surface normal 504A, the geometry normal 506A may not contain the low frequency bias. Thus, the geometry normal 506A may be smooth and may not need to be passed through the gaussian-filter. The gaussian-filtered surface normal may be compared with the geometry normal 506A using the least-square difference operation to obtain the rotation matrix 508A. It should be noted that the surface normal 504A and the geometry normal 506A may not be directly compared due to presence of a number of outliers in the surface normal 504A that may not make the surface normal 504A resemble the geometry normal 506A. The rotation matrix 508A may convert the surface normal 504A from the world-space to the object space based on rotation of the surface normal 504A. The geometry normal 506A may then be discarded as it may only be required for conversion of the surface normal 504A from the world-space to the object space.

At 510, a surface normal correction may be performed. The circuitry 202 may be further configured to correct the converted surface normal based on a removal of the low frequency bias from the converted surface normal. As discussed, the converted surface normal may include finer micro-geometry details and low frequency bias that may need to be removed. In order to remove the low frequency bias, the converted surface normal may be passed through a low frequency gaussian filter that may filter out the low frequency bias from the converted surface normal to obtain the corrected surface normal. The corrected surface normal may be smooth as it may not contain the low frequency bias.

At 512, corrected surface normal may be converted from the object space to a tangent space. The circuitry 202 may be configured to convert the corrected surface normal from the object space to the tangent space based on the 3D mesh. The corrected surface normal may be in the object space and therefore, the orientation of the corrected surface normal may be relative to that of the object. Similarly, orientation of the converted surface normal vector may be relative to the surface of the object and may be independent of the geometry of the object.

At 514, a normal map generation may be performed. The circuitry 202 may be configured to generate the normal map 514A based on the converted surface normal vector. The generated normal map 514A may be associated to the surface and may be independent of the geometry of the object.

At 516, an optimization operation may be executed. The circuitry 202 may be configured to execute the optimization operation to generate the height map 516A in the UV space. The optimization operation may be executed such that tangent vectors of the height map 516A in the UV space remain perpendicular to normal vectors corresponding to the generated normal map 514A. It should be noted that the height map 516A may be a raster image used for representing elevation such as bumps in a 3D mesh. The generated height map 516A may appear as a grayscale image and may directly reflect thigh frequency bumps and cavity on geometry and may easily be used for geometry cleanup and detailing. The generated height map 516A and the generated normal map 514A may contain micro-geometry detail that may be missing on the 3D mesh (i.e., the base mesh generated at 304 of FIG. 3). The generated height map 516A and the generated normal map 514A may be used for generation of realistic rendering without subdividing the 3D mesh. However, the generated normal map 514A in general may be preferred.

It should be noted that the 3D mesh prepared by game and/or movie studios may not have an exact shape correspondence to a scanned shape of the object, which makes it difficult to use the generated normal map 514A from the polarization-based light cage directly. Instead, the generated height map 516A may be preferred.

Typically, a height map may be generated based on a refinement of a high-resolution 3D mesh with a separately measured normal map. The refinement may be followed by a computation of the height map based on the high-resolution 3D mesh. However, the height map generated using the above operations may be overly smooth and may lack details compared to the generated normal map 514A. In contrast, the circuitry 202 may generate the height map 516A in the UV space based on the optimization operation. In the optimization operation, the 3D mesh may be assumed to have a well-organized topology and a UV pixel neighborhood may be roughly equivalent to its corresponding 3D neighborhood. Also, the height map 516A may be optimized such that tangent vectors of the height map 516A in the UV space remain perpendicular to the normal vector. The number and directions of the tangent vectors may be selectable, with a minimal of two that may provide a maximum feasibility space for optimizing the height map 516A. Finally, a regularization term may be used to reduce a height variation from the surface of 3D mesh.

At 518, a gradient operation may be executed. The circuitry 202 may be configured to generate the refined normal map 518A based on application of the gradient operation on the height map 516A. After the height map 516A is generated, the refined normal map 518A may be generated. The refined normal map 518A may include details and properties that exists in the normal map 514A. Also, the refined normal map 518A may have finer details and overall less noise compared to the normal map 514A.

Figure 6:
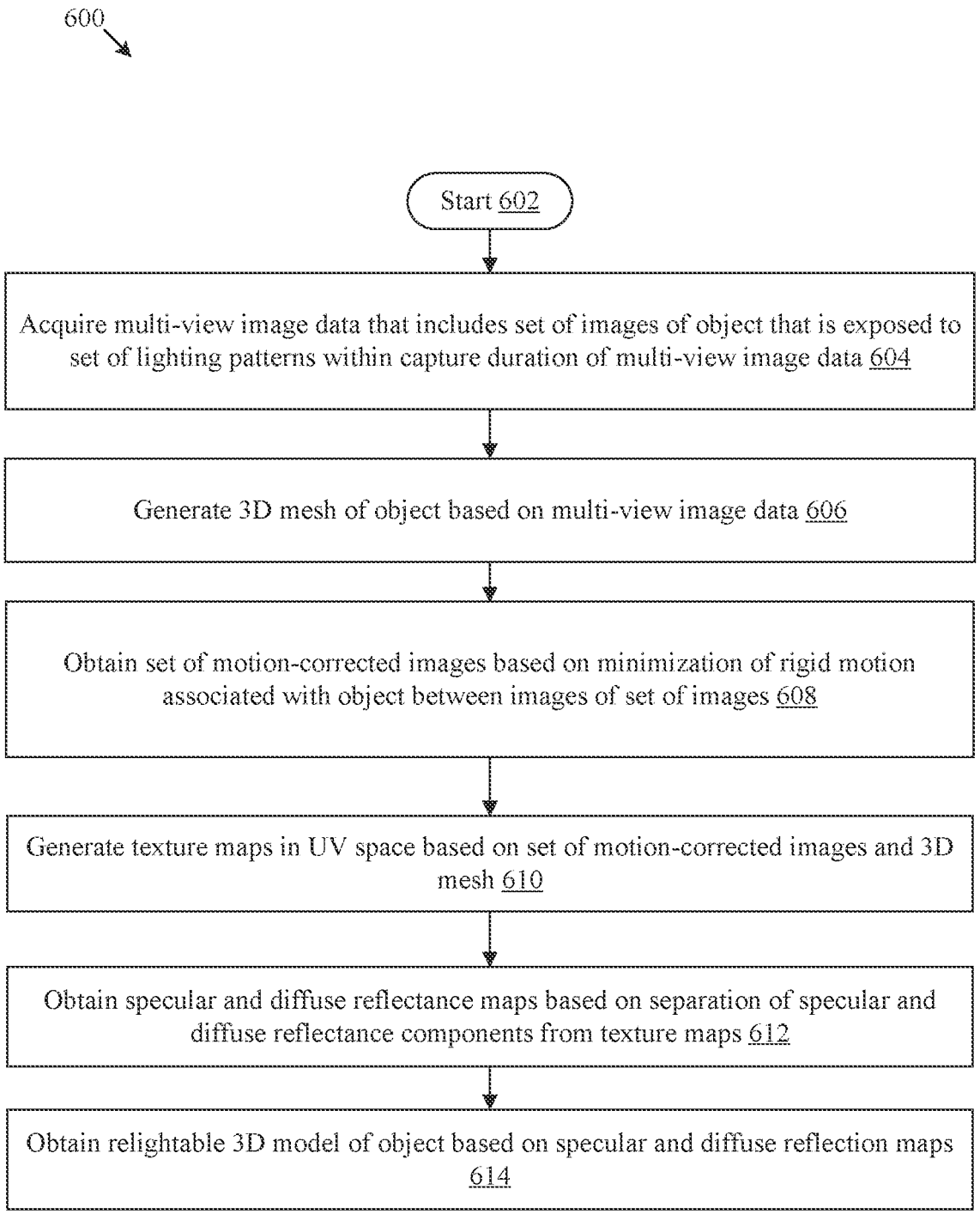
FIG. 6 is a diagram that illustrates an exemplary processing pipeline for generation of reflectance maps for relightable 3D models, in accordance with an embodiment of the disclosure.

FIG. 6 is a flowchart that illustrates operations of an exemplary method for generation of reflectance maps for relightable 3D models, in accordance with an embodiment of the disclosure. FIG. 6 is described in conjunction with elements from FIG. 1, FIG. 2, FIG. 3A, FIG. 3B, FIG. 4, and FIG. 5. With reference to FIG. 6, there is shown a flowchart 600. The flowchart 600 may include operations from 602 to 614 and may be implemented by the electronic device 102 of FIG. 1 or by the circuitry 202 of FIG. 2. The flowchart 600 may start at 602 and proceed to 604.

At 604, multi-view image data 112 that includes the set of images of the object may be acquired. The circuitry 202 may be configured to acquire the multi-view image data 112 that includes the set of images of the object. The object may be exposed to the set of lighting patterns within a capture duration of the multi-view image data 112. Details related to acquisition of the multi-view image data 112 are provided, for example, in FIG. 3A.

At 606, a 3D mesh of the object may be generated based on the multi-view image data 112. The circuitry 202 may be configured to generate the 3D mesh of the object based on the multi-view image data 112. Details related to the 3D mesh are provided, for example, in FIG. 1 and at 304 in FIG. 3A.

At 608, a set of motion-corrected images may be obtained based on minimization of the rigid motion associated with the object between images of the set of images. The circuitry 202 may be configured to obtain the set of motion-corrected images (such as the set of motion-corrected images 306A of FIG. 3A) based on the minimization of the rigid motion between the images. Details related to correction of the set of images are provided, for example, at 306 in FIG. 3A.

At 610, texture maps may be generated in the UV space based on the set of motion-corrected images and the 3D mesh. The circuitry 202 may be configured to generate texture maps in the UV space based on the set of motion-corrected images and the 3D mesh. Details related to generation of the texture maps are further provided, for example, at 310 in FIG. 3B.

At 612, specular and diffuse reflectance maps may be obtained based on the separation of specular and diffuse reflectance components from the texture maps. The circuitry 202 may be configured to obtain specular and diffuse reflectance maps based on the separation of specular and diffuse reflectance components from the texture maps. The specular and diffuse reflectance components may be separated from the cross-polarization UV texture map and the parallel-polarized UV texture map. Details related to generation of the specular and diffuse reflectance maps are provided, for example, at 312 in FIG. 3B.

At 614, a relightable 3D model of the object may be obtained based on the specular and diffuse reflectance maps. The circuitry 202 may be configured to obtain the relightable 3D model of the object based on the specular and diffuse reflectance maps. Control may pass to end.

Although the flowchart 800 is illustrated as discrete operations, such as, 604, 606, 608, 610, 612, and 614, the disclosure is not so limited. Accordingly, in certain embodiments, such discrete operations may be further divided into additional operations, combined into fewer operations, or eliminated, depending on the implementation without detracting from the essence of the disclosed embodiments.

Various embodiments of the disclosure may provide a non-transitory computer-readable medium and/or storage medium having stored thereon, computer-executable instructions executable by a machine and/or a computer to operate an electronic device (for example, the electronic device 102 of FIG. 1). Such instructions may cause the electronic device 102 to perform operations that may include acquiring multi-view image data (for example, the multi-view image data 302A of FIG. 3A) that includes a set of images of an object. Herein, the object may be exposed to a set of lighting patterns within a capture duration of the multi-view image data. The operations may further include generating a 3D mesh (for example, the 3D mesh 304A of FIG. 3A) of the object based on the multi-view image data. The operations may further include obtaining a set of motion-corrected images (for example, the set of motion-corrected images 306A of FIG. 3A) based on a minimization of a rigid motion associated with the object between images of the set of images. The operations may further include generating texture maps in a UV space based on the set of motion-corrected images and the 3D mesh. The operations may further include obtaining specular and diffuse reflectance maps (for example, the specular reflectance map 312A and the diffuse reflectance map 312B of FIG. 3B) based on a separation of specular and diffuse reflectance components from the texture maps. The operations may further include obtaining a relightable 3D model (for example, the relightable 3D model 314A of FIG. 3B) based of the object based on the specular and diffuse reflectance maps.

Exemplary aspects of the disclosure may provide an electronic device (such as, the electronic device 102 of FIG. 1) that includes circuitry (such as, the circuitry 202). The circuitry 202 may be configured to acquire multi-view image data (for example, the multi-view image data 302A of FIG. 3A) that includes a set of images of an object. Herein, the object may be exposed to a set of lighting patterns within a capture duration of the multi-view image data. The circuitry 202 may be configured to generate a 3D mesh (for example, the 3D mesh 304A of FIG. 3A) of the object based on the multi-view image data. The circuitry 202 may be configured to obtain a set of motion-corrected images (for example, the set of motion-corrected images 306A of FIG. 3A) based on a minimization of a rigid motion associated with the object between images of the set of images. The circuitry 202 may be configured to generate texture maps in a UV space based on the set of motion-corrected images and the 3D mesh. The circuitry 202 may be configured to obtain specular and diffuse reflectance maps (for example, the specular reflectance map 312A and the diffuse reflectance map 312B of FIG. 3B) based on a separation of specular and diffuse reflectance components from the texture maps. The circuitry 202 may be configured to obtain a relightable 3D model (for example, the relightable 3D model 314A of FIG. 3B) based of the object based on the specular and diffuse reflectance maps.

In an embodiment, the set of lighting patterns may include one or more of a cross-polarized omni-directional lighting pattern and gradient lighting patterns, and polarized lighting patterns, including a cross-polarized lighting pattern and a parallel-polarized lighting pattern.

In an embodiment, the circuitry 202 may be configured to acquire a colored checker image that is exposed to a cross-polarized omni-directional lighting pattern. The circuitry

202 may be configured to estimate a color matrix based on a comparison of color values of the color checker image with reference color values. The circuitry 202 may be configured to apply the estimated color matrix on a subset of images of the set of motion-corrected images to obtain a set of color-corrected images. Herein, the subset of images may be associated with one of an omni-directional cross-polarization lighting pattern or a parallel polarization lighting pattern.

In an embodiment, the set of color-corrected images may be obtained further based on a conversion of each image of the subset to a set of de-mosaiced images.

In an embodiment, the circuitry 202 may be configured to estimate an ambient occlusion based on a 3D shape of the 3D mesh. The circuitry 202 may be configured to refine the specular and diffuse reflectance maps based on a removal of the ambient occlusion from the specular and diffuse reflectance maps. Herein, the relightable 3D mesh of the object may be obtained based on the refined specular and diffuse reflectance maps.

In an embodiment, the circuitry 202 may be configured to generate a color map based on a linear combination of the specular and diffuse reflectance maps.

In an embodiment the circuitry 202 may be configured to obtain a set of specular-separated gradient images based on a removal of a diffuse component from each image that is associated with a gradient lighting pattern and is included in the set of motion-corrected images.

In an embodiment, the circuitry 202 may be configured to compute a surface normal corresponding to each pixel of an image of the set of specular-separated gradient images. The circuitry 202 may be configured to compute a geometry normal by linearly combining a set of vertex normal corresponding to the 3D mesh, wherein the combination is performed based on barycentric coordinates of each pixel the generated texture maps in the UV space.

In an embodiment, the circuitry 202 may be configured to convert the surface normal from a world-space to an object space by applying a rotation matrix on the surface normal. The circuitry 202 may be configured to correct the converted surface normal based on a removal of a low frequency bias from the converted surface normal. The circuitry 202 may be configured to convert the corrected surface normal vector from the object space to a tangent space based on the 3D mesh. The circuitry 202 may be configured to generate a normal map based on the converted surface normal vector.

In an embodiment, the circuitry 202 may be configured to estimate the rotation matrix based on application of a least-square difference operation on a gaussian-filtered surface normal and the geometry normal.

In an embodiment, the circuitry 202 may be configured to execute an optimization operation to generate a height map in the UV space. Herein, the optimization operation may be executed such that tangent vectors of the height map in the UV space are perpendicular to normal vectors corresponding to the generated normal map.

In an embodiment, the circuitry 202 may be configured to generate a refined normal map based on application of a gradient operation on the height map.

The present disclosure may also be positioned in a computer program product, which comprises all the features that enable the implementation of the methods described herein, and which when loaded in a computer system is able to carry out these methods. Computer program, in the present context, means any expression, in any language, code or notation, of a set of instructions intended to cause a system with information processing capability to perform a particular function either directly, or after either or both of the following: a) conversion to another language, code or notation; b) reproduction in a different material form.

While the present disclosure is described with reference to certain embodiments, it will be understood by those skilled in the art that various changes may be made, and equivalents may be substituted without departure from the scope of the present disclosure. In addition, many modifications may be made to adapt a particular situation or material to the teachings of the present disclosure without departure from its scope. Therefore, it is intended that the present disclosure is not limited to the embodiment disclosed, but that the present disclosure will include all embodiments that fall within the scope of the appended claims.

What is claimed is:

1. An electronic device, comprising:
    circuitry configured to:
        acquire multi-view image data that includes a set of images of an object,
            wherein the object is exposed to a set of lighting patterns within a capture duration of the multi-view image data;
        generate a three-dimensional (3D) mesh of the object based on the multi-view image data;
        obtain a set of motion-corrected images based on a minimization of a rigid motion associated with the object between images of the set of images;
        generate texture maps in a UV space based on the set of motion-corrected images and the 3D mesh;
        obtain specular and diffuse reflectance maps based on a separation of specular and diffuse reflectance components from the texture maps; and
        obtain a relightable 3D model of the object based on the specular and diffuse reflectance maps.

2. The electronic device according to claim 1, wherein the object is a human head, and
    the multi-view image data is acquired from an imaging setup that operates as a polarization-based light cage.

3. The electronic device according to claim 1, wherein the set of lighting patterns includes one or more of a cross-polarized omni-directional lighting pattern, gradient lighting patterns, or polarized lighting patterns, including a cross-polarized lighting pattern and a parallel-polarized lighting pattern.

4. The electronic device according to claim 1, wherein the circuitry is further configured to:
    acquire a colored checker image that is exposed to a cross-polarized omni-directional lighting pattern;
    estimate a color matrix based on a comparison of color values of the color checker image with reference color values; and
    apply the estimated color matrix on a subset of images of the set of motion-corrected images to obtain a set of color-corrected images,
        wherein the subset of images is associated with one of an omni-directional cross-polarization lighting pattern or a parallel polarization lighting pattern.

5. The electronic device according to claim 4, wherein the set of color-corrected images is obtained further based on a conversion of each image of the subset to a set of de-mosaiced images.

6. The electronic device according to claim 1, wherein the circuitry is further configured to:
    estimate an ambient occlusion based on a 3D shape of the 3D mesh; and refine the specular and diffuse reflectance maps based on a removal of the ambient occlusion from the specular and diffuse reflectance maps,
wherein the relightable 3D model of the object is obtained based on the refined specular and diffuse reflectance maps.

7. The electronic device according to claim 1, wherein the circuitry is further configured to generate a color map based on a linear combination of the specular and diffuse reflectance maps.

8. The electronic device according to claim 1, wherein the circuitry is further configured to obtain a set of specular-separated gradient images based on a removal of a diffuse component, from each image that is associated with a gradient lighting pattern and is included in the set of motion-corrected images.

9. The electronic device according to claim 8, wherein the circuitry is further configured to:
compute a surface normal corresponding to each pixel of an image of the set of specular-separated gradient images; and
compute a geometry normal by a linear combination of a set of vertex normals corresponding to the 3D mesh, wherein the combination is performed based on barycentric coordinates of each pixel of the generated texture maps in the UV space.

10. The electronic device according to claim 9, wherein the circuitry is further configured to:
convert the surface normal from a world-space to an object space by application of a rotation matrix on the surface normal;
correct the converted surface normal based on a removal of a low frequency bias from the converted surface normal;
convert the corrected surface normal from the object space to a tangent space based on the 3D mesh; and
generate a normal map based on the converted surface normal.

11. The electronic device according to claim 10, wherein the circuitry is further configured to estimate the rotation matrix based on application of a least-square difference operation on a gaussian-filtered surface normal and the geometry normal.

12. The electronic device according to claim 10, wherein the circuitry is further configured to execute an optimization operation to generate a height map in the UV space, and
wherein the optimization operation is executed such that tangent vectors of the height map in the UV space are perpendicular to normal vectors corresponding to the generated normal map.

13. The electronic device according to claim 12, wherein the circuitry is further configured to generate a refined normal map based on application of a gradient operation on the height map.

14. A method, comprising:
in an electronic device:
acquiring multi-view image data that includes a set of images of an object,
wherein the object is exposed to a set of lighting patterns within a capture duration of the multi-view image data;
generating a three-dimensional (3D) mesh of the object based on the multi-view image data;
obtaining a set of motion-corrected images based on a minimization of a rigid motion associated with the object between images of the set of images;
generating texture maps in a UV space based on the set of motion-corrected images and the 3D mesh;
obtaining specular and diffuse reflectance maps based on a separation of specular and diffuse reflectance components from the texture maps; and
obtaining a relightable 3D model of the object based on the specular and diffuse reflectance maps.

15. The method according to claim 14, wherein
the object is a human head, and
the multi-view image data is acquired from an imaging setup that operates as a polarization-based light cage.

16. The method according to claim 14, wherein the set of lighting patterns includes one or more of a cross-polarized omni-directional lighting pattern, gradient lighting patterns, or polarized lighting patterns, including a cross-polarized lighting pattern and a parallel-polarized lighting pattern.

17. The method to claim 14, further comprising:
acquiring a colored checker image that is exposed to a cross-polarized omni-directional lighting pattern;
estimating a color matrix based on a comparison of color values of the color checker image with reference color values; and
applying the estimated color matrix on a subset of images of the set of motion-corrected images to obtain a set of color-corrected images,
wherein the subset of images is associated with one of an omni-directional cross-polarization lighting pattern or a parallel polarization lighting pattern.

18. The method according to claim 17, wherein the set of color-corrected images is obtained further based on converting each image of the subset to a set of de-mosaiced images.

19. The method according to claim 14, further comprising:
estimating an ambient occlusion based on a 3D shape of the 3D mesh; and
refining the specular and diffuse reflectance maps based on a removal of the ambient occlusion from the specular and diffuse reflectance maps,
wherein the relightable 3D model of the object is obtained based on the refined specular and diffuse reflectance maps.

20. A non-transitory computer-readable medium having stored thereon, computer-executable instructions that when executed by an electronic device, causes the electronic device to execute operations, the operations comprising:
acquiring multi-view image data that includes a set of images of an object,
wherein the object is exposed to a set of lighting patterns within a capture duration of the multi-view image data;
generating a three-dimensional (3D) mesh of the object based on the multi-view image data;
obtaining a set of motion-corrected images based on a minimization of a rigid motion associated with the object between images of the set of images;
generating texture maps in a UV space based on the set of motion-corrected images and the 3D mesh;
obtaining specular and diffuse reflectance maps based on a separation of specular and diffuse reflectance components from the texture maps; and
obtaining a relightable 3D model of the object based on the specular and diffuse reflectance maps.

* * * * *